(12) United States Patent
Chen et al.

(10) Patent No.: US 8,547,483 B2
(45) Date of Patent: Oct. 1, 2013

(54) IMAGE PROCESSING METHOD AND IMAGE PROCESSING APPARATUS

(75) Inventors: Mei-Ju Chen, Hsinchu Hsien (TW); Jen-Shi Wu, Hsinchu Hsien (TW); Wei-Kuo Lee, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 226 days.

(21) Appl. No.: 12/872,165

(22) Filed: Aug. 31, 2010

(65) Prior Publication Data
US 2011/0075039 A1 Mar. 31, 2011

(30) Foreign Application Priority Data
Sep. 30, 2009 (TW) .............................. 98133141 A (51) Int. Cl.
H04N 5/21 (2006.01)
H04N 9/68 (2006.01)
H04N 9/64 (2006.01)
H04N 9/77 (2006.01)
G06K 9/40 (2006.01)

(52) U.S. Cl.
USPC ........... 348/645; 348/625; 348/713; 382/264; 382/266

(58) Field of Classification Search
USPC .................. 348/607, 625, 645, 713; 382/264
See application file for complete search history.

(56) References Cited

U.S. PATENT DOCUMENTS

| | | | | |
|---|---|---|---|---|
| 7,289,163 B2* | 10/2007 | Lin et al. | ........................ | 348/631 |
| 7,454,081 B2* | 11/2008 | Demas et al. | ................. | 382/268 |
| 7,486,844 B2* | 2/2009 | Chang et al. | .................. | 382/300 |
| 8,014,598 B2* | 9/2011 | Cho et al. | ........................ | 382/167 |
| 8,150,191 B2* | 4/2012 | Madnani | ........................ | 382/255 |
| 2004/0036704 A1* | 2/2004 | Han et al. | ....................... | 345/690 |
| 2004/0109014 A1* | 6/2004 | Henderson | .................... | 345/716 |
| 2005/0013489 A1* | 1/2005 | Boettcher et al. | ............. | 382/225 |
| 2005/0220360 A1* | 10/2005 | Zaklika et al. | ................ | 382/275 |
| 2006/0164555 A1* | 7/2006 | Klompenhouwer et al. | . | 348/625 |
| 2007/0189632 A1* | 8/2007 | Wu et al. | ........................ | 382/266 |
| 2008/0247643 A1* | 10/2008 | Ishiga | ............................ | 382/167 |
| 2008/0273793 A1* | 11/2008 | Oishi | ............................. | 382/167 |
| 2008/0310750 A1* | 12/2008 | Osamoto et al. | ............... | 382/261 |
| 2009/0009779 A1* | 1/2009 | Do | .................................. | 358/1.9 |
| 2009/0324136 A1* | 12/2009 | Yamada et al. | ................ | 382/300 |
| 2010/0061625 A1* | 3/2010 | Lukac | ............................ | 382/162 |
| 2010/0111422 A1* | 5/2010 | Lee et al. | ....................... | 382/195 |

\* cited by examiner

*Primary Examiner* — Brian Yenke
(74) *Attorney, Agent, or Firm* — Han IP Corporation (57) ABSTRACT

An image processing method includes receiving an image data including a first pixel, a second pixel and a third pixel, the second pixel being between the first pixel and the third pixel; calculating a difference between two initial chrominance values of the first pixel and two initial chrominance values of the second pixel to determine a first difference, and calculating a difference between the two initial chrominance values of the second pixel and two initial chrominance values of the third pixel to determine a second difference; comparing the first difference with the second difference to select either the first pixel or the third pixel as a target pixel; and determining two adjusted chrominance values of the second pixel according to at least two initial chrominance values of the target pixel.

9 Claims, 12 Drawing Sheets

Calculate the first and second difference ($d_1$, $d_2$) between initial Cb and Cr of the pixel $P_5$ and initial Cb and Cr of neighboring pixels ($P_1$, $P_9$) on both sides of the pixel $P_5$ — 800

Compare the first difference $d_1$ with the second difference $d_2$ to select the pixel $P_1$ or the pixel $P_9$ as a target pixel — 802

Determine a chrominance HF parameter $V_{HF}$ in the range between the pixel $P_1$ and the pixel $P_9$ — 804

Determine a chrominance LF parameter $V_{LF}$ of the pixel $P_1$ to the pixel $P_9$ — 806

Determine a weight W according to the first difference $d_1$, the second difference $d_2$, the chrominance HF parameter $V_{HF}$ and the chrominance LF parameter $V_{LF}$ — 808

Weighted average initial Cb and Cr of the pixel $P_5$ and initial Cb and Cr of the target pixel to obtain adjusted Cb and Cr of the pixel $P_5$ — 810

IMAGE PROCESSING METHOD AND IMAGE PROCESSING APPARATUS

CROSS REFERENCE TO RELATED PATENT APPLICATIONS

This patent application claims priority from Taiwan Patent Application No. 098133141, filed on Sep. 30, 2009, entitled "Image Processing Method and Image Processing Apparatus", and incorporates the Taiwan patent application in its entirety by reference.

TECHNICAL FIELD

The present disclosure relates to an image processing apparatus, and more particularly, to an image processing apparatus and a method thereof capable of solving edge blur of an object in an image.

BACKGROUND OF THE PRESENT DISCLOSURE

In a common image display system, e.g., a television (TV), a digital camera (DC) or a personal computer, considering a sawtooth edge created due to noise interferences or a scaled-down image (e.g., when a high-resolution image is converted into a low-resolution image), a low-pass filter is implemented to improve its image quality. Generally speaking, the low-pass filter generates a filtered luminance/chrominance value of a pixel by weighted-averaging the luminance/chrominance value of the pixel and luminance/chrominance values of neighboring pixels. After the low-pass filtering, an image edge of the low-pass filtered image data is relatively smooth.

Figure 1:
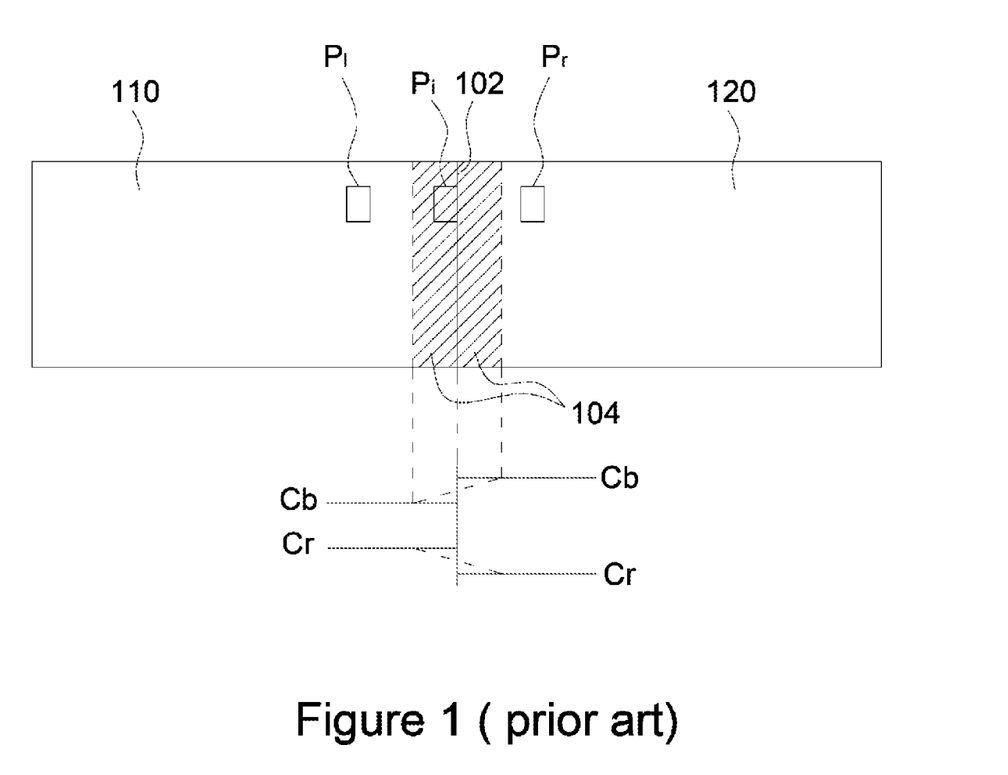
FIG. 1 is a schematic diagram of a change of a value Cb/Cr of an image edge of a low-pass filtered image frame.

However, although the low-pass filtering can reduce the image noises and solve the problem of a sawtooth edge, the image edge meanwhile becomes blurred due to the low-pass filtering. Referring to FIG. 1, suppose that an original image frame comprises two neighboring areas 110 and 120 of different colors (e.g., the color in the area 110 is yellow and the color in the area 120 is blue), and between the two neighboring areas 110 and 120 is an edge 102. After a low-pass filtering, the edge 102 becomes blurred, and thus a blurred area 104 is formed in the vicinity of the edge 102. Chrominance changes of the area 102 are illustrated with reference to chrominance values Cb and Cr at the bottom of FIG. 1. Solid lines are distributions of chrominance values Cb and Cr of the original image frame, and dashed lines are distributions of chrominance values Cb and Cr of the area 104 after the low-pass filtering. As observed from the values Cb and Cr in FIG. 1, pixels in the area 104 have different colors.

Figure 2:
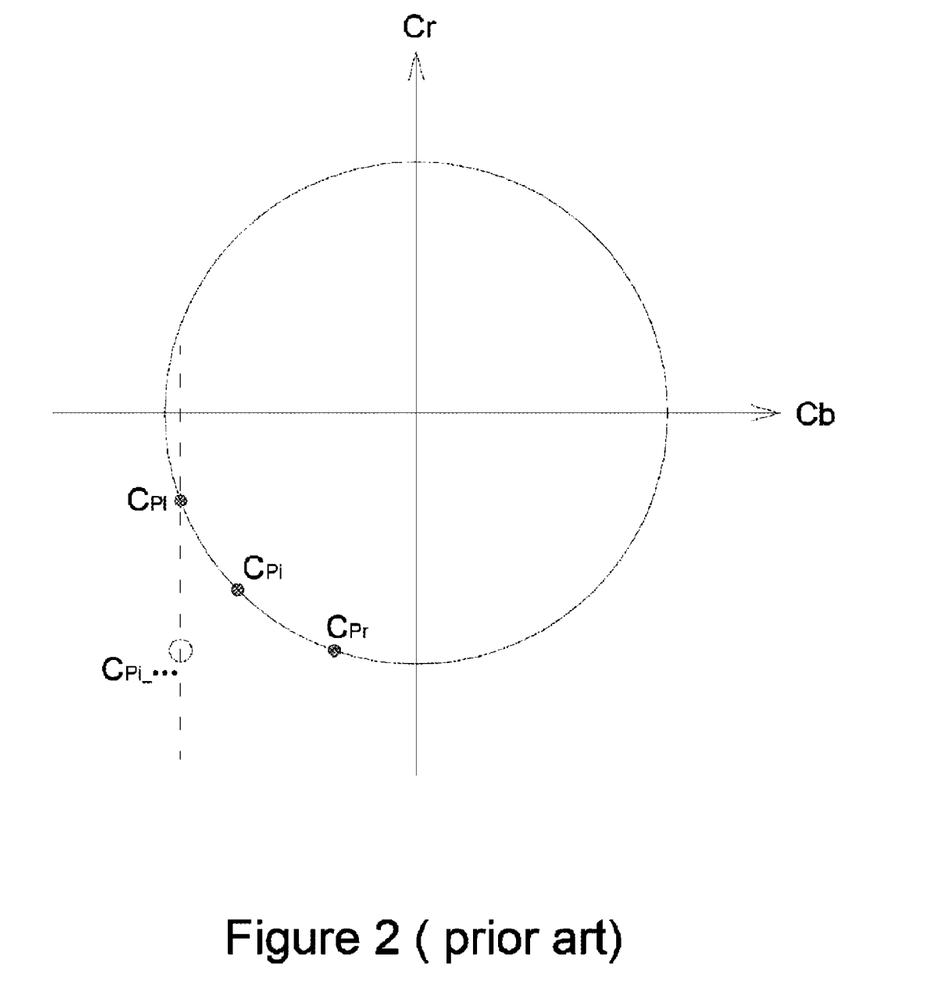
FIG. 2 is a schematic diagram of a conventional method for solving a problem of image edge blur.

In order to solve the problem of edge blur of the low-pass filtered image frame, a common approach is that the image display system performs edge enhancement on the low-pass filtered image frame. Following description is given with reference to FIG. 1 and FIG. 2. FIG. 2 shows a schematic diagram of a conventional method for solving the problem of edge blur of an image. $C_{Pi}$, $C_{P1}$, and $C_{Pr}$ in FIG. 2 are respectively coordinate points of pixels Pi, P1, and Pr in color coordinate axes in FIG. 1. For the conventional method, the chrominance values Cb and Cr of the pixel Pi in the blurred area 104 are adjusted to the chrominance values Cb and Cr of the pixel P1 or Pr to solve the problem of edge blur. For example, the image display system determines whether the value Cb of the pixel Pi is more approximate to the value Cb of the pixel P1 or the pixel Pr, and defines the more approximate value Cb (i.e., the value Cb of the pixel P1 or the pixel Pr) as an adjusted value Cb of the pixel Pi. Likewise, the image display system determines whether the value Cr of the pixel Pi is more approximate to the value Cr of the pixel P1 or the pixel Pr, and defines the more approximate value Cr (i.e., the value Cb of the pixel P1 or the pixel Pr) as an adjusted value Cr of the pixel P. An object of the foregoing method is to adjust the color of the area 104 to the color of the area 110 or the area 120, so as to solve the problem of edge blur. However, with respect to a special situation in FIG. 2, the foregoing method may form another color at the image edge of the image frame to create image frame distortion. Referring to FIG. 2, since the value Cb of the pixel Pi is more approximate to the value Cb of the pixel P1, the adjusted value Cb of the pixel Pi is equal to the value Cb of the pixel P1; and since the value Cr of the pixel Pi is more approximate to the value Cr of the pixel Pr, the adjusted value Cr of the pixel Pi is equal to the value Cr of the pixel Pr. As illustrated in FIG. 2, the coordinate point $C_{Pi\_adj}$ of an adjusted chrominance value of the pixel $P_i$ in the color coordinate axes represents another color, which is different from a color (represented by a coordinate $C_{P1}$) of the area 110 and a color (represented by a coordinate $C_{Pr}$) of the area 120, and thus image quality of the image frame is deteriorated as the image frame distortion is created.

SUMMARY OF THE PRESENT DISCLOSURE

An object of the present disclosure is to provide an image processing method and an image processing apparatus to effectively solve the problem of edge blur without incurring image distortion.

According to an embodiment of the present disclosure, an image processing method comprises receiving an image data comprising a first pixel, a second pixel and a third pixel, all of which being neighboring pixels, the second pixel being between the first pixel and the third pixel; calculating a first difference between two initial chrominance values of the first pixel and two initial chrominance values of the second pixel and a second difference between the two initial chrominance values of the second pixel and two initial chrominance values of the third pixel; comparing the first difference with the second difference to select one of the first pixel and the third pixel as a target pixel, wherein the first pixel is selected as the target pixel when the first difference is smaller than the second difference, and the third pixel is selected as the target pixel when the first difference is larger than the second difference; and determining two adjusted chrominance values of the second pixel according to two initial chrominance values of the target pixel.

According to another embodiment of the present disclosure, an image processing apparatus comprises for receiving an image data and generating an adjusted image data, the image data at least comprising a neighboring pixels including a first pixel, a second pixel and a third pixel, the second pixel being between the first pixel and the third pixel. The image processing apparatus comprises a chrominance difference calculating unit, for calculating a first difference between two initial chrominance values of the first pixel and two initial chrominance values of the second pixel and a second difference between the two initial chrominance values of the second pixel and two initial chrominance values of the third pixel; a target pixel determining unit, for comparing the first difference with the second difference to select one of the first pixel and the third pixel as a target pixel, wherein the first pixel is selected as the target pixel when the first difference is smaller than the second difference, and the third pixel is selected as the target pixel when the first difference is larger than the second difference; and a chrominance adjusting unit, for determining the two adjusted chrominance values of the second pixel according to the two initial chrominance values of the target pixel.

According to yet another embodiment, an image processing method comprises receiving an image data comprising a first pixel, a second pixel and a third pixel, all of which being neighboring pixels, the second pixel being between the first pixel and the third pixel; calculating a first difference between an initial chrominance value of the first pixel and an initial chrominance value of the second pixel and a second difference between the initial chrominance value of the second pixel and an initial chrominance value of the third pixel, wherein the initial chrominance value is one of Cb value and Cr value; comparing the first difference with the second difference to select either the first pixel or the third pixel as a target pixel, wherein the first pixel is selected as the target pixel when the first difference is smaller than the second difference, and the third pixel is selected as the target pixel when the first difference is larger than the second difference; and determining an adjusted chrominance value of the second pixel according to the initial chrominance value of the target pixel and the initial chrominance value of the second pixel.

DETAILED DESCRIPTION OF THE PREFERRED EMBODIMENT

Figure 3:
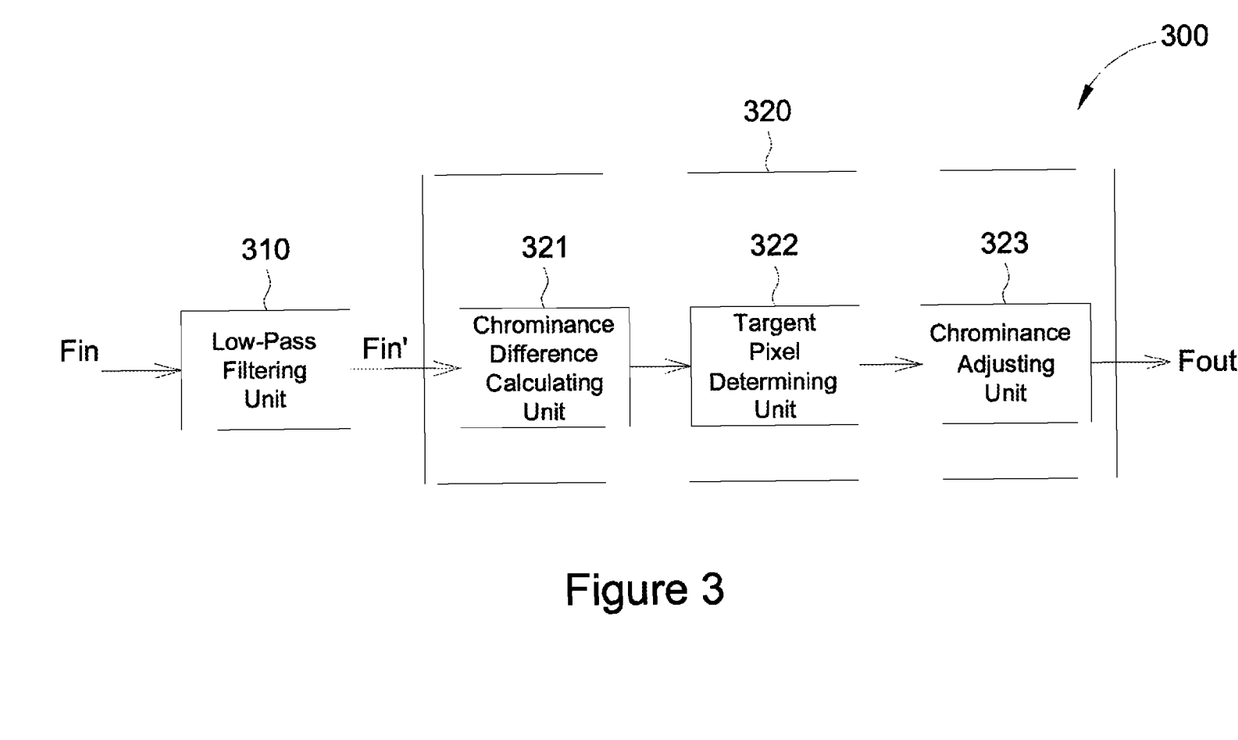
FIG. 3 is a block diagram of an image processing apparatus in accordance with an embodiment of the present disclosure.

FIG. 3 shows a schematic diagram of an image processing apparatus 300 in accordance with an embodiment of the present disclosure. The image processing apparatus 300 comprises a low-pass filtering unit 310 and an image adjusting unit 320. The mage adjusting unit 320 comprises a chrominance difference calculating unit 321, a target pixel determining unit 322, and a chrominance adjusting unit 323. The image processing apparatus 300 may be applied to electronic products comprising screens for displaying image frames, e.g., TVs, personal computers, and DCs, and may be realized by software or hardware.

Figure 4:
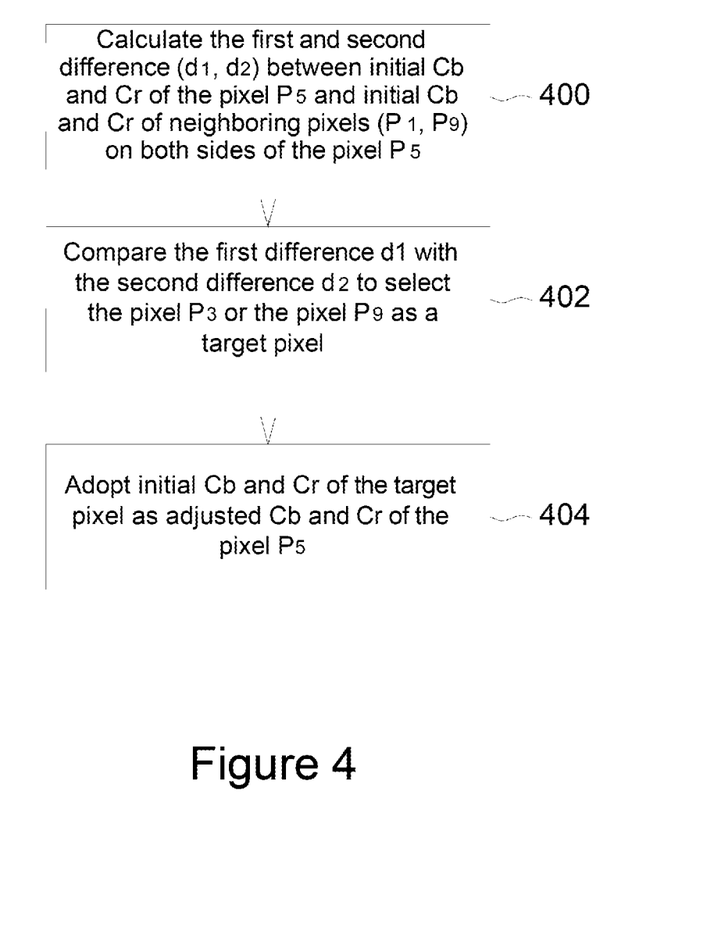
FIG. 4 is a flow chart of performing image processing by an image adjusting unit of an image processing apparatus on an initial image data in accordance with an embodiment of the present disclosure.
Figure 5:
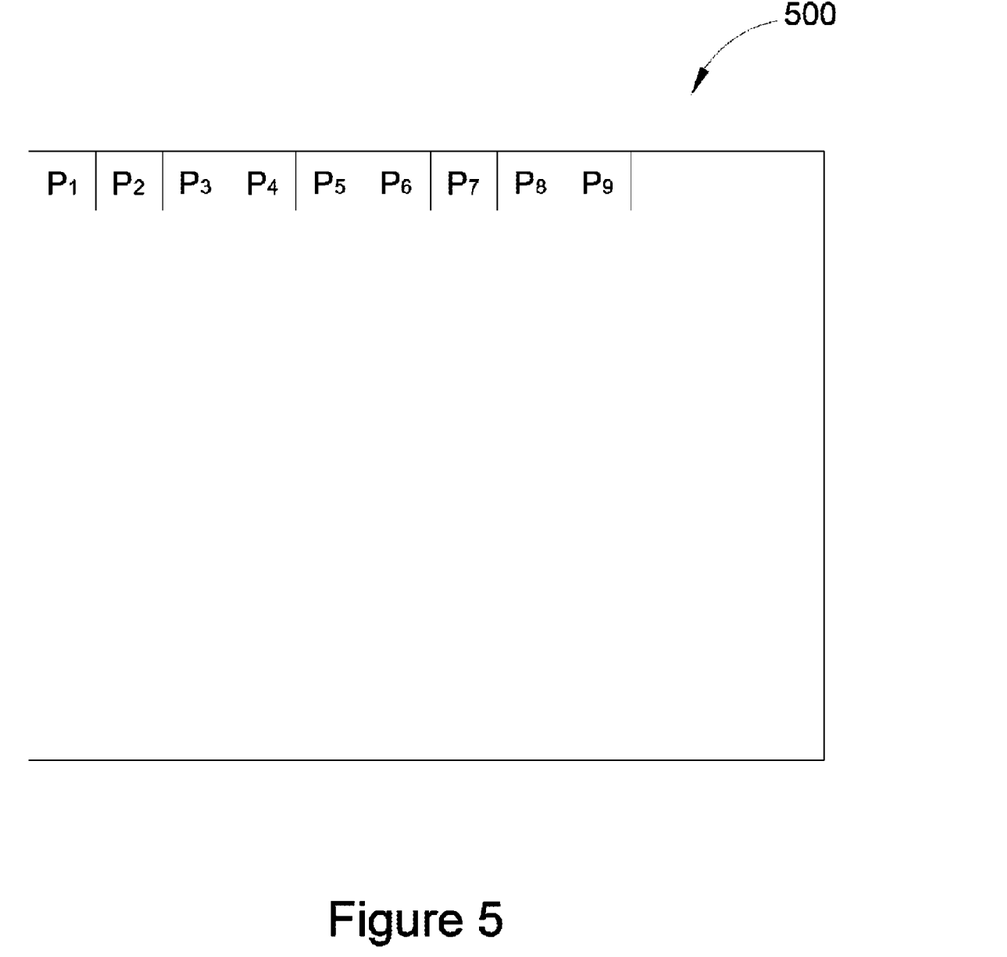
FIG. 5 is a schematic diagram of a frame.

The following description is given with reference to FIG. 3 and FIG. 4. FIG. 4 shows a flow chart of performing by the image adjusting unit 320 of the image processing apparatus image processing on an initial image data $F_{in}'$ accordance with an embodiment of the present disclosure. The initial image data $F_{in}'$ is generated from an image data $F_{in}$ processed by the low-pass filtering unit 310. Take a pixel $P_5$ in a frame 500 of the initial image data $F_{in}'$ as an example in the following description of the flow chart in FIG. 4. FIG. 5 shows a schematic diagram of the frame 500, each pixel of the frame 500 comprises two initial chrominance values (e.g., chrominance values Cb/Cr, UN or chrominance values compliant to other specifications, however, only the chrominance values Cb and Cr are taken as an example in the following description), and the two initial chrominance values Cb and Cr are low-pass filtered chrominance values.

In Step 400, the chrominance difference calculating unit 321 calculates differences between two initial chrominance values Cb and Cr of the pixel $P_5$ and initial chrominance values Cb and Cr of neighboring pixels on two sides of the pixel $P_5$. Suppose that there are a plurality of pixels (e.g., 2 to 15 pixels) between the two neighboring pixels and the pixel $P_5$. For example, a pixel $P_1$ on the left side of the pixel $P_5$ and a pixel $P_9$ on the right side of the pixel $P_5$ are selected as the neighboring pixels. It is to be noted that, the pixel $P_1$ and the pixel $P_9$ described for illustration purposes shall not be construed as limiting the present disclosure. In other embodiment, the pixels $P_1$ and $P_9$ may also be replaced by other pixels on two sides of the pixel $P_5$.

Figure 6:
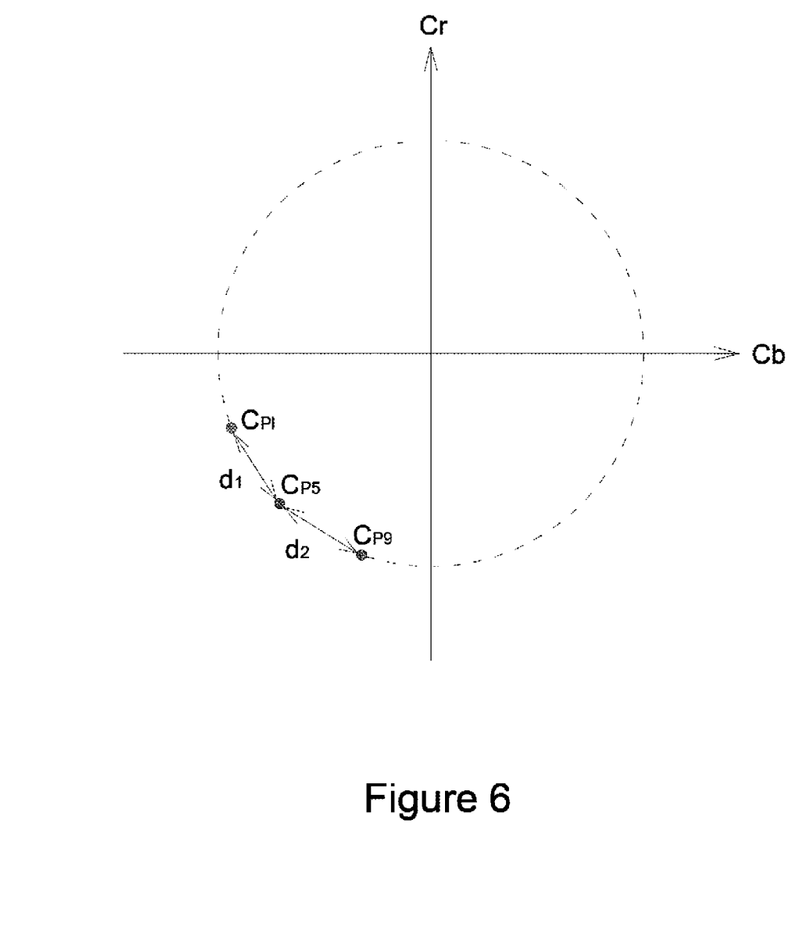
FIG. 6 is a schematic diagram illustrating how a first difference and a second difference are determined.

More specifically, the chrominance difference calculating unit 321 calculates a first difference $d_1$ between the initial chrominance values Cb and Cr of the pixel $P_5$ and initial chrominance values Cb and Cr of the pixel $P_1$, and calculates a second difference $d_2$ between the initial chrominance values Cb and Cr of the pixel $P_5$ and initial chrominance values Cb and Cr of the pixel $P_9$. FIG. 6 shows a schematic diagram illustrating how the first difference $d_1$ and a second difference $d_2$ are determined. $C_{P1}$, $C_{P5}$ and $C_{P9}$ are respectively values of coordinate points of the pixels $P_1$, $P_5$ and $P_9$ in color coordinate axes, $d_1$ is calculated as $d_1 = \sqrt{(C_{P1\_Cb} - C_{P5\_Cb})^2 + (C_{P1\_Cr} - C_{P5\_Cr})^2}$, and $d_2$ is calculated as $d_2 = \sqrt{(C_{P9\_Cb} - C_{P5\_Cb})^2 + (C_{P9\_Cr} - C_{P5\_Cr})^2}$, where $C_{P1\_Cb}$, $C_{P5\_Cb}$ and $C_{P9\_Cb}$ are respectively values of the coordinate points $C_{P1}$, $C_{P5}$ and $C_{P9}$ on a coordinate axis Cb, and $C_{P1\_Cr}$, $C_{P5\_Cb}$ and $C_{P9\_Cb}$ are respectively values of the coordinate points $C_{P1}$, $C_{P5}$ and $C_{P9}$ on a coordinate axis Cr. It is to be noted that, the first difference $d_1$ in FIG. 6 represents distances along the color coordinate axes between the initial chrominance values Cb and Cr of the pixel $P_5$ and the pixel $P_1$, and the second difference $d_2$ represents a distance along the color coordinate axes between the initial chrominance values Cb and Cr of the pixel $P_5$ and the pixel $P_9$. However, in other embodiments of the present disclosure, the first difference $d_1$ may be other values that represent the differences between the chrominance values Cb and Cr of the pixel $P_5$ and the pixel $P_1$, and the second difference $d_2$ may be other values that represent the differences between the chrominance values Cb and Cr of the pixel $P_5$ and the pixel $P_9$.

In Step 402, the target pixel determining unit 322 compares the first difference $d_1$ with the second difference $d_2$ to select the pixel $P_1$ or the pixel $P_9$ as a target pixel. When the first difference $d_1$ is smaller than the second difference $d_2$, it means that a color of the pixel $P_5$ is more approximate to that of the pixel $P_1$, and the pixel $P_1$ is selected as the target pixel; otherwise, when the first difference $d_1$ is larger than the second difference $d_2$, it means that the color of the pixel $P_5$ is more approximate to that of the pixel $P_9$, and the pixel $P_9$ is selected as the target pixel. In Step 404, the chrominance adjusting unit 323 directly adopts initial chrominance values Cb and Cr of the target pixel as adjusted chrominance values Cb and Cr of the pixel $P_5$, and then performs on each pixel of the image data $F_{in}'$ image processing similar to that performed on the pixel $P_5$, so as to output an adjusted image data $F_{out}$.

A significance of Step 402 and Step 404 is that, when the pixel $P_5$ (e.g., the pixel $P_5$ is regarded as the pixel $P_1$ in FIG. 1) is an image edge and the chrominance values Cb and Cr of the pixel $P_5$ are different from those of the pixel $P_1$ and the pixel $P_9$ due to the low-pass filtering, by using the foregoing method in Step 402 and Step 404, the adjusted chrominance values Cb and Cr of the pixel $P_5$ become the same as those of the pixel $P_1$ or the pixel $P_9$, thereby enhancing the image edge. In addition, in the embodiment in FIG. 3 and FIG. 4, when the chrominance difference between the pixels $P_5$ and $P_1$ is smaller the chrominance difference between the pixels $P_9$ and $P_1$, the chrominance adjusting unit 323 regards the chrominance values Cb and Cr of the pixel $P_1$ as the adjusted chrominance values Cb and Cr of the pixel $P_5$; when the chrominance difference between the pixels $P_5$ and $P_1$ is bigger the chrominance difference between the pixels $P_9$ and $P_1$, the chrominance adjusting unit 323 regards the chrominance values Cb and Cr of the pixel $P_9$ as the adjusted chrominance values Cb and Cr of the pixel $P_5$. Accordingly, variances in the adjusted chrominance values of the pixel $P_5$ may be slight, and the image edge is then free from any significant distortions.

Although the embodiment in FIG. 3 and FIG. 4 are capable of enhancing the image edge without incurring image distortion, the image processing method in FIG. 4 may still create image distortion with respect to two following particular situations. Under a first situation, the color of the pixel $P_5$ is different from that of the pixel $P_1$ or the pixel $P_9$, i.e., the pixel $P_5$ is not only at an edge between two colors of the pixel $P_1$ and $P_9$. For example, supposing that in the image data $F_{in}$, initial colors of the pixels $P_1$ to $P_4$ are yellow, the initial color of the pixel $P_5$ is orange, initial colors of the pixel $P_6$ to $P_9$ are blue (e.g., the pixels $P_1$ to $P_9$ of the initial image data $F_{in}'$ have similar colors to those of the image data $F_{in}$), in the first situation, the adjusted pixel $P_5$ changes to yellow or blue (i.e., the initial orange color disappears), thus causing image distortion. In addition, under a second situation, the pixels $P_1$ to $P_9$ are gradient color pixels, i.e., colors of the pixels $P_1$ to $P_9$ with a same color tone have gradually increased or gradually reduced saturations (e.g., colors changing from pale red to dark red). Under the second situation, the adjusted colors of the pixels $P_1$ to $P_9$ cannot truly represent gradient color pixels when the method in FIG. 3 and FIG. 4 are applied. For example, a relatively large difference may be formed between color saturations represented by adjusted chrominance values of the pixels $P_3$ and $P_4$, such that an obvious edge is formed, and accordingly thus causing image distortion.

Figure 7:
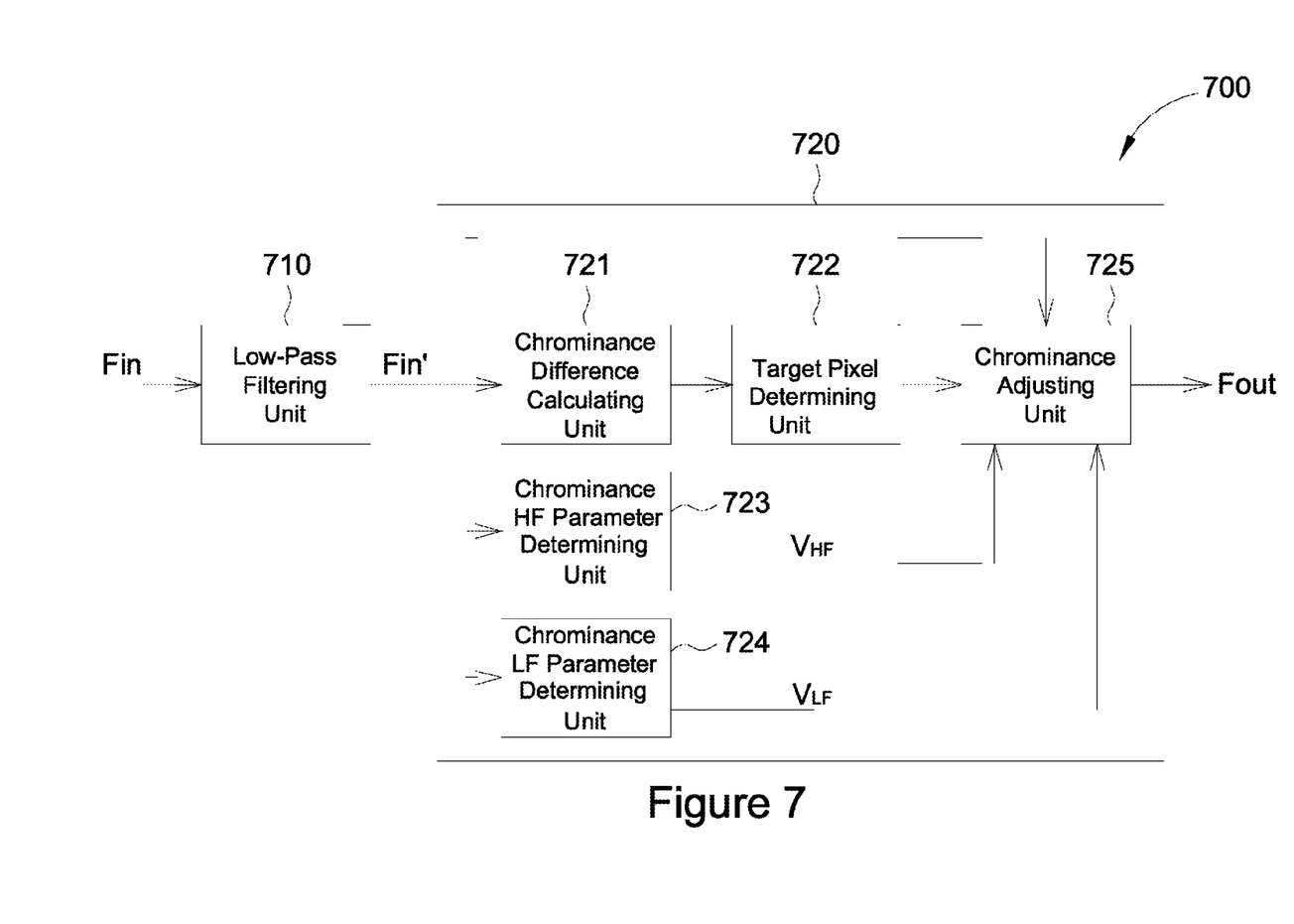
FIG. 7 is a block diagram of an image processing apparatus in accordance with another embodiment of the present disclosure.

FIG. 7 shows a schematic diagram of an image processing apparatus 700 in accordance with another embodiment of the present disclosure for solving the foregoing problem. The image processing apparatus 700 comprises a low-pass filtering processing unit 710 and an image adjusting unit 720. The image adjusting unit 720 comprises a chrominance difference calculating unit 721, a target pixel determining unit 722, a chrominance high-frequency (HF) parameter determining unit 723, a chrominance low-frequency (LF) parameter determining unit 724, and a chrominance adjusting unit 725.

Figure 8:
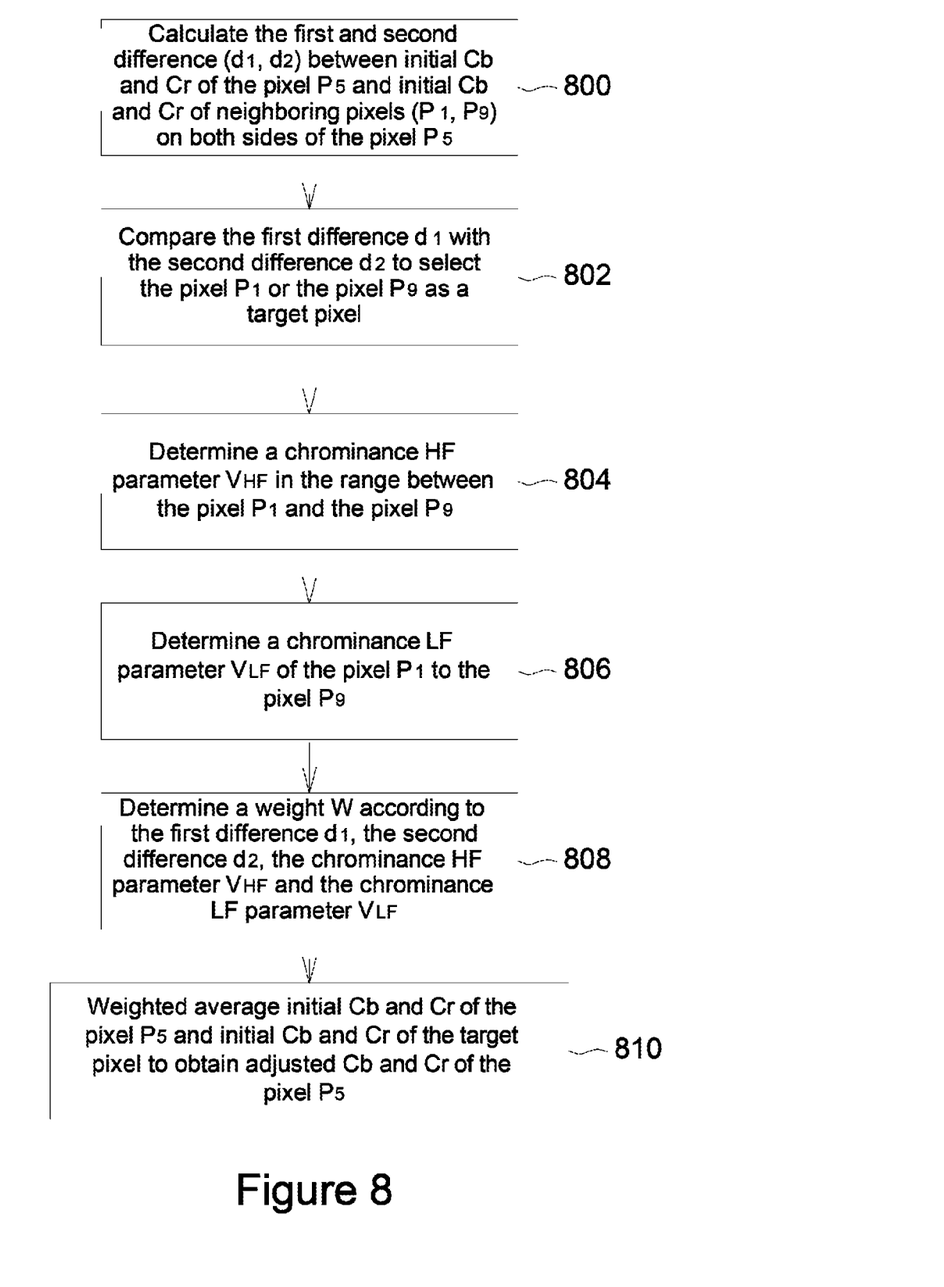
FIG. 8 is a flow chart of performing image processing by an image adjusting unit of an image processing apparatus on an initial image data in accordance with another embodiment of the present disclosure.

The following description is given with reference to FIG. 7 and FIG. 8. FIG. 8 shows a flow chart of performing image processing by an image adjusting unit 720 of an image processing apparatus 700 on an initial image data $F_{in}'$ in accordance with another embodiment of the present disclosure. The initial image frame data $F_{in}'$ is generated from an image data $F_{in}$ processed by the low-pass filtering unit 710. The pixel $P_5$ in the frame 500 (in FIG. 5) of the image frame data $F_{in}'$ is taken as an example in the following description of the flow chart in FIG. 8. Each pixel of the frame 500 comprises two initial chrominance values that are low-pass filtered.

In Step 800, the chrominance difference calculating unit 721 calculates differences between initial chrominance values Cb and Cr of the pixel $P_5$ and those of two neighboring pixels on two sides of the pixel $P_5$, and there are a plurality of pixels (e.g., 2 to 15 pixels) between the two neighboring pixels, e.g., a pixel $P_1$ on the left side of the pixel $P_1$, and a pixel $P_9$ on the right side of the pixel $P_5$. In the following description, the pixel $P_1$ and the pixel $P_9$ described for illustration purposes shall not be construed as limiting the present disclosure, and in other embodiments, the pixels $P_1$ and $P_9$ may also be replaced by other pixels on two sides of the pixel $P_5$.

More specifically, the chrominance difference calculating unit 721 calculates differences between the initial chrominance values Cb and Cr of the pixel $P_5$ and those of the pixel $P_1$ to determine a first difference $d_1$, and calculates differences between the initial chrominance values Cb and Cr of the pixel $P_5$ and those of the pixel $P_9$ to determine a second difference $d_2$. FIG. 6 shows a schematic diagram illustrating how the first difference $d_1$ and the second difference $d_2$ are determined, where $C_{P1}$, $C_{P5}$ and $C_{P9}$ are respectively values of coordinate points of the pixel $P_1$, $P_5$ and $P_9$ in color coordinate axes. It is to be noted that, the first difference $d_1$ in FIG. 6 is a distance along the color coordinate axes between the chrominance values Cb and Cr of the pixel $P_5$ and the pixel $P_1$, and the second difference $d_2$ is a distance along the color coordinate axes between the chrominance values Cb and Cr of the pixel $P_5$ and the pixel $P_9$. However, the differences $d_1$ and $d_2$ are not limitations of the present disclosure. In other embodiments of the present disclosure, the first difference $d_1$ is other values that represent the differences between the chrominance values Cb and Cr of the pixel $P_5$ and those of the pixel $P_1$, and the second difference $d_2$ is other values that represent the difference between the chrominance values Cb and Cr of the pixel $P_5$ and those of the pixel $P_9$.

In Step 802, the target pixel determining unit 722 compares the first difference $d_1$ and the second difference $d_2$ to select either the pixel $P_1$ or the pixel $P_9$ as a target pixel. When the first difference $d_1$ is smaller than the second difference $d_2$, it means that an initial color of the pixel $P_5$ is more approximate to that of the pixel $P_1$, and the pixel $P_1$ is selected as the target pixel; otherwise, when the first difference $d_1$ is greater than the second difference $d_2$, it means that the initial color of the pixel $P_5$ is more approximate to that of the pixel $P_9$, and the pixel $P_9$ is selected as the target pixel.

In Step 804, the chrominance HF parameter determining unit 723 determines a chrominance HF parameter $V_{HF}$ in the range between the pixel $P_1$ and the pixel $P_9$ according to a chrominance change degree of pixels in the range between the pixel $P_1$ and the pixel $P_9$. That is, the chrominance HF parameter $V_{HF}$ represents the change in chrominance values Cb and Cr of the pixels in the range between the pixel $P_1$ and the pixel $P_9$. In other embodiments of the present disclosure, the greater the chrominance HF parameter $V_{HF}$ is, the larger the change between the chrominance values Cb and Cr of the pixels in the range between the pixel $P_1$ and the pixel $P_9$ gets (i.e., the pixels in the range between the pixel $P_1$ and the pixel $P_9$ comprise a third color tone that is different from the pixel $P_1$ or the pixel $P_9$). The chrominance HF parameter $V_{HF}$ is calculated as:

$$V_{HF}=\max\{|Cb\_end\_diff-Cb\_sum\_diff|,|Cr\_end\_diff-Cr\_sum\_diff|\} \quad (1)$$

wherein, $$Cb\_end\_diff=|Cb_{P1}-Cb_{P9}| \quad (2)$$

$$Cb\_sum\_diff=|Cb_{P1}-Cb_{P2}|+|Cb_{P2}-Cb_{P3}|+|Cb_{P3}-Cb_{P4}|+|Cb_{P4}-Cb_{P5}|+|Cb_{P5}-Cb_{P6}|+|Cb_{P6}-Cb_{P7}|+|Cb_{P7}-Cb_{P8}|+|Cb_{P8}-Cb_{P9}| \quad (3)$$

$$Cr\_end\_diff=|Cr_{P1}-Cr_{P9}| \quad (4)$$

$$Cr\_sum\_diff=|Cr_{P1}-Cr_{P2}|+|Cr_{P2}-Cr_{P3}|+|Cr_{P3}-Cr_{P4}|+Cr_{P4}-Cr_{P5}|+|Cr_{P5}-Cr_{P6}|+|Cr_{P6}-Cr_{P7}|+|Cr_{P7}-Cr_{P8}|+|Cr_{P8}-Cr_{P9}| \quad (5)$$

Wherein, $Cb_{P1}$ to $Cb_{P9}$ are initial chrominance values Cb of the pixels $P_1$ to $P_9$, and $Cr_{P1}$ to $Cr_{P9}$ are initial chrominance values Cr of the pixels $P_1$ to $P_9$.

Figure 9:
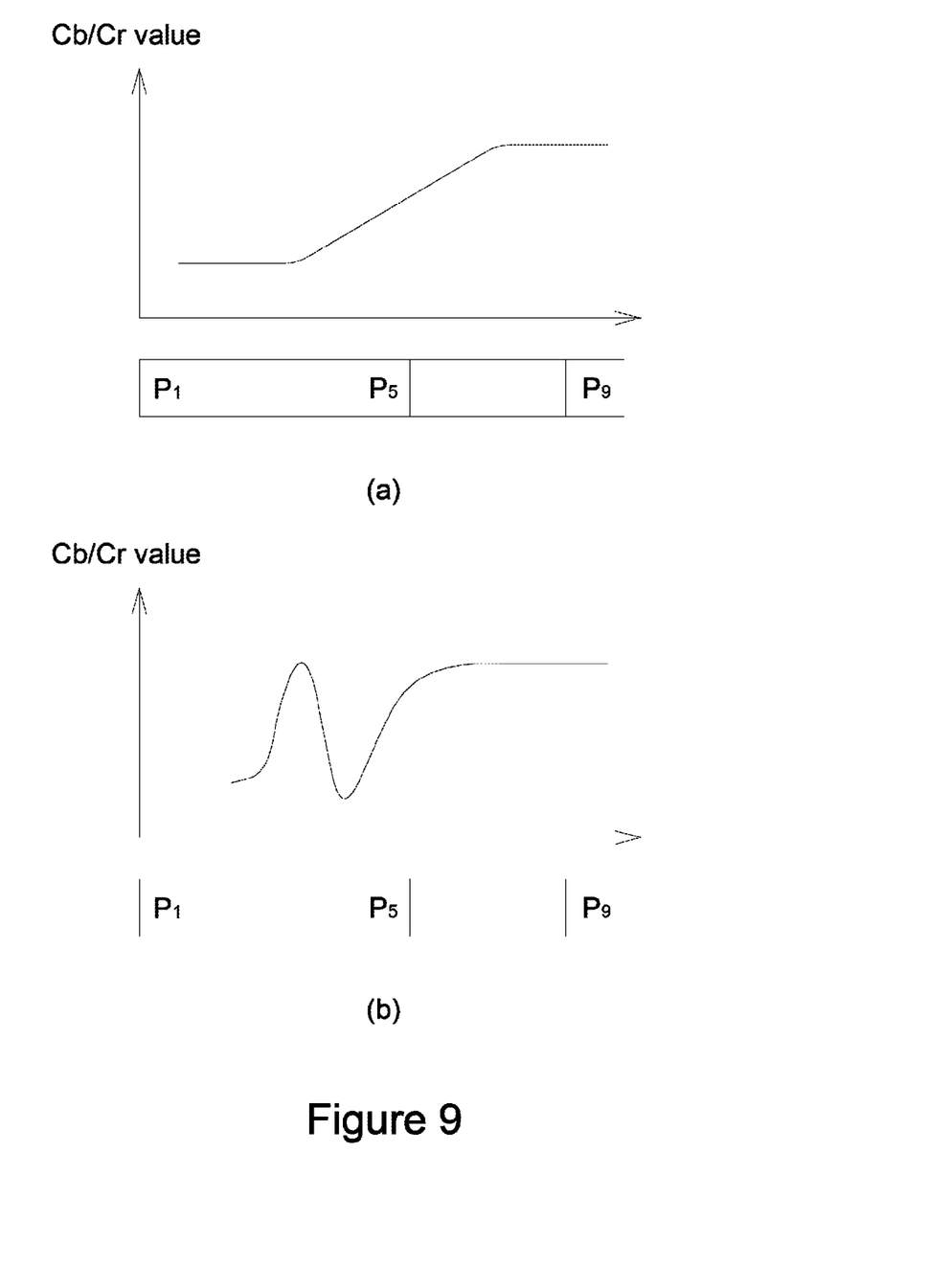
FIG. 9 of a distribution curve of Cb/Cr when there are different degrees of chrominance changes between the pixels $P_1$ to $P_9$.

A significance of the chrominance HF parameter $V_{HF}$ is described with reference to FIG. 9(a) showing a schematic diagram of initial chrominance values Cb/Cr of the pixels $P_1$ to $P_9$ when there is no third color pixel between the pixel $P_1$ and the pixel $P_9$ (i.e., the chrominance change degree of the pixel $P_1$ to the pixel $P_9$ is small). Since the initial chrominance values Cb/Cr of the pixels $P_1$ to $P_9$ are represented by a smooth curve in FIG. 9(a), Cb_end_diff and Cr_end_diff respectively approximate to Cb_sum_diff and Cr_sum_diff, such that the calculated chrominance HF parameter $V_{HF}$ is relatively small. FIG. 9(b) shows a schematic diagram of the initial chrominance value Cb/Cr of the pixels $P_1$ to $P_9$ when there is a third color tone between the pixel $P_1$ and the pixel $P_9$ (i.e., the chrominance change degree of the pixel $P_1$ to the pixel $P_9$ is large). Since the initial chrominance value Cb/Cr of the pixels $P_1$ to $P_9$ is drastically changed, Cb_end_diff is larger than Cb_sum_diff and Cr_sum_diff is larger than Cr_end_diff, and accordingly the chrominance change degree in the pixel $P_1$ to the pixel $P_9$ of the image data $F_{in}$ is determined according to the calculated chrominance HF parameter $V_{HF}$.

It is to be noted that, the foregoing formula for calculating the chrominance HF parameter $V_{HF}$ is applied in this embodiment for example, and in other embodiments of the present disclosure, the chrominance HF parameter $V_{HF}$ can be calculated by other formulae provided that the chrominance HF parameter $V_{HF}$ can reflect the chrominance change in the pixel $P_1$ to the pixel $P_9$ (i.e., the change in the pixel $P_1$ to the pixel $P_9$ of the image data $F_{in}$ originally having a third type of color different from colors of the pixel $P_1$ and the pixel $P_9$). Various other methods may also be adopted to calculate the chrominance HF parameter $V_{HF}$—such modifications are within the spirit and scope of the present disclosure.

In Step 806, the chrominance LF parameter determining unit 724 determines a chrominance LF parameter $V_{LF}$ of the pixel $P_1$ to the pixel $P_9$ according to whether the pixel $P_1$ to the pixel $P_9$ are gradient color pixels. In this embodiment of the present disclosure, the greater the chrominance LF parameter $V_{LF}$ is, the higher the possibility that the pixel $P_1$ to the pixel $P_9$ are gradient color pixels gets. The chrominance LF parameter $V_{LF}$ is calculated as:

$$V_{LF}=\min\{|1/Cb\_diff|,|1/Cr\_diff|\} \quad (6)$$

wherein, $$Cb\_diff=|Cb_{P5}-Cb_{P1}|+|Cb_{P5}-Cb_{P9}| \quad (7.1)$$

$$Cr\_diff=|Cr_{P5}-Cr_{P1}|+|Cr_{P5}-Cr_{P9}| \quad (8.1)$$

Generally speaking, when the pixels $P_1$ to $P_9$ are gradient color pixels, the initial chrominance values Cb and Cr of the pixel $P_1$ are extremely approximate to those of the pixel $P_9$ (for that the gradient color pixels are the same color with different saturations). Accordingly, the foregoing Cb_diff and Cr_diff are extremely small, such that the chrominance LF parameter $V_{LF}$ is relatively large. On the contrary, when the pixels $P_1$ to $P_9$ are not gradient color pixels, the chrominance values Cb and Cr of the pixels $P_1$ and $P_9$ are relatively large, such that the chrominance LF parameter $V_{LF}$ is relatively small. In addition, the foregoing formulae for calculating Cb_diff and Cr_diff may be modified, e.g., differences between initial chrominance values Cb and Cr of the pixel $P_5$ and those of the neighboring pixels are calculated to determine the chrominance LF parameter $V_{LF}$ as:

$$Cb\_diff=|Cb_{P5}-Cb_{P3}|+|Cb_{P5}-Cb_{P7}| \quad (7.2)$$

$$Cr\_diff=|Cr_{P5}-Cr_{P3}|+|Cr_{P5}-Cr_{P7}| \quad (8.2)$$

It is to be noted that, the foregoing formulae for calculating the chrominance LF parameter $V_{LF}$ is applied in this embodiment as an example, and in other embodiments of the present disclosure, the chrominance LF parameter $V_{LF}$ may be calculated by other formulae provided that the chrominance LF parameter $V_{LF}$ can truly reflect the degree of the gradient color in the range between the pixel $P_1$ and the pixel $P_9$. Various other methods may also be applied to calculate the chrominance LF parameter $V_{LF}$—such modifications are within the spirit and scope of the present disclosure.

In Step 808, the chrominance adjusting unit 725 determines a weight W according to the first difference $d_1$, the second difference $d_2$, the chrominance HF parameter $V_{HF}$ and the chrominance LF parameter $V_{LF}$. In Step 810, the chrominance adjusting unit 725 respectively weighted-averaging two initial chrominance values of the pixel $P_5$ and two initial chrominance values of the target pixel to obtain two adjusted chrominance values of the pixel $P_5$, and the two adjusted chrominance values are calculated as:

$$Cb_{P5\_adj}=W*Cb_{Ptar}+(1-W)*Cb_{P5} \quad (9)$$

$$CF_{P5\_adj}=W*Cr_{Ptar}+(1-W)*CF_{P5} \quad (10)$$

Wherein, $Cb_{P5\_adj}$ and $Cr_{P5\_adj}$ are adjusted chrominance values Cb and Cr of the pixel $P_5$, $Cb_{Ptar}$ and $Cr_{Ptar}$ are respectively initial chrominance values Cb and Cr of the target pixel (i.e., one of the pixel $P_1$ and the pixel $P_9$), and $Cb_{P5}$ and $Cr_{P5\_adj}$ are respectively of initial chrominance values Cb and Cr of the pixel $P_5$.

The weight W is calculated as:

$$W=W_1*W_2*W_3 \quad (11)$$

Figure 10:
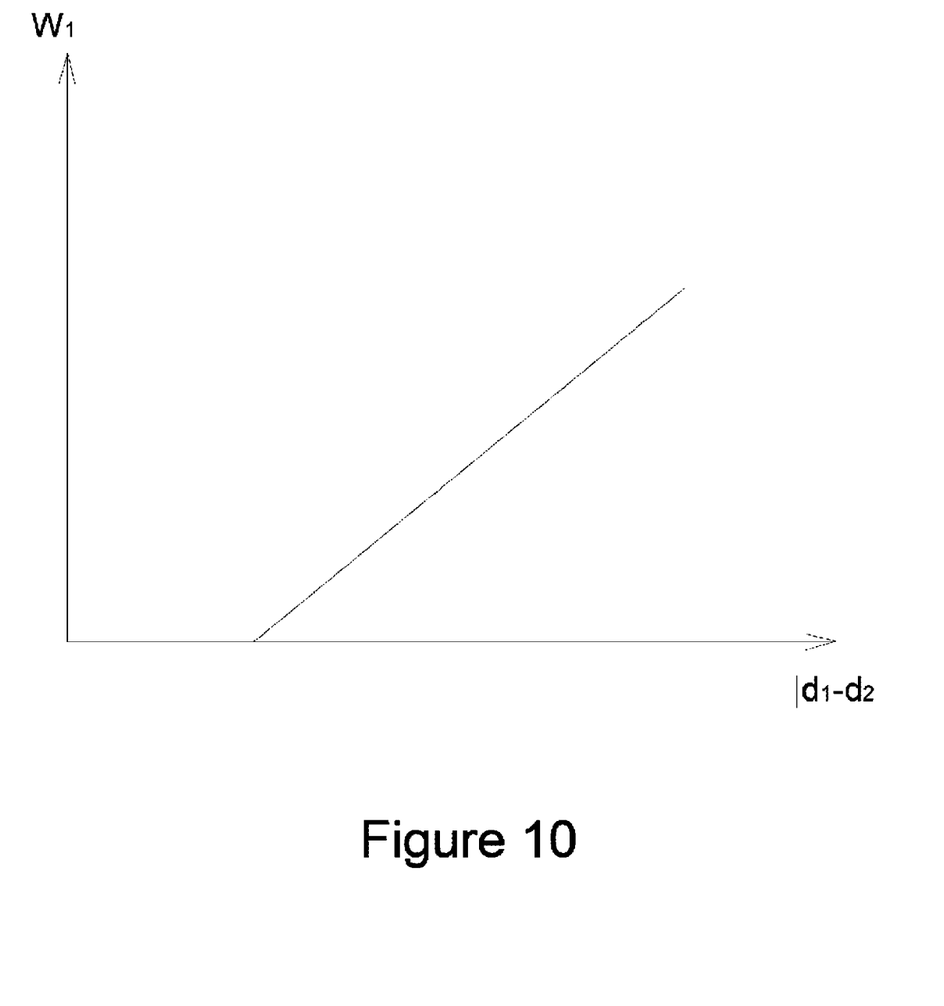
FIG. 10 is a relation curve between a difference between a first difference and a second difference and a parameter $W_1$.

Wherein, $W_1$ is obtained according to a difference between the first difference $d_1$ and the second difference $d_2$ via a calculation or a lookup table with reference to a first weight curve shown in FIG. 10; $W_2$ is obtained according to the chrominance HF parameter $V_{HF}$ via a calculation or a lookup table with reference to a second weight curve shown in FIG. 11; and $W_3$ is obtained according to the chrominance $V_{LF}$ via a calculation or a lookup table with reference to a third weight curve shown in FIG. 12.

Figure 11:
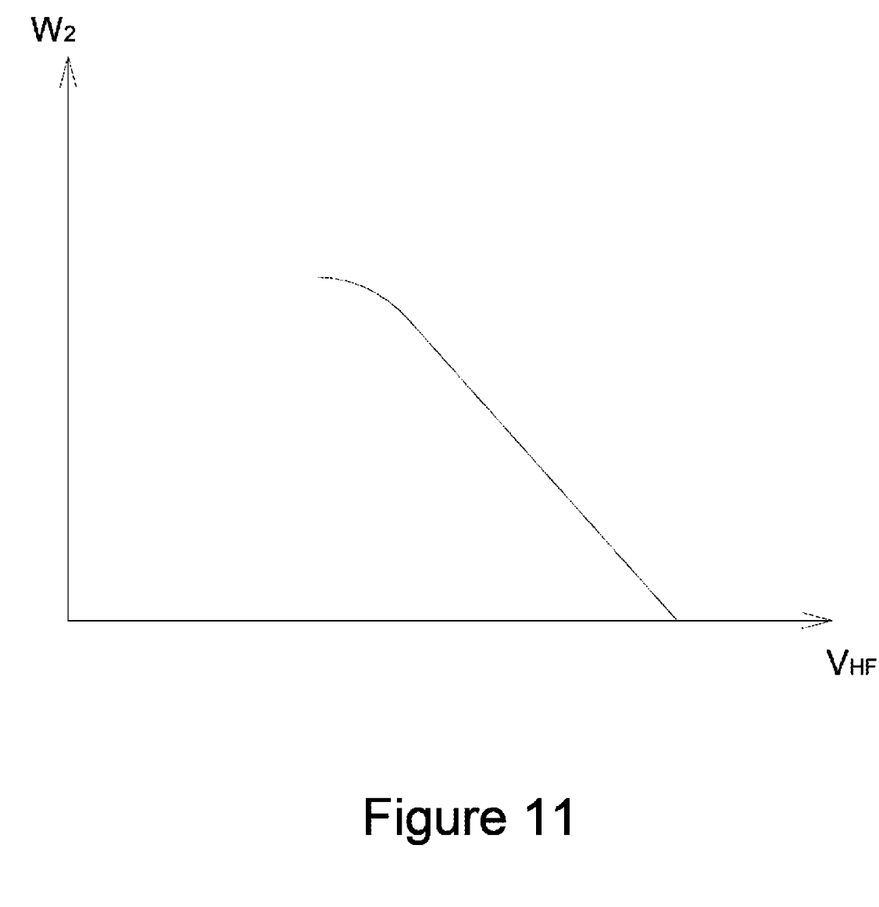
FIG. 11 is a relation curve between a high-frequency (HF) chrominance parameter $V_{HF}$ and a parameter $W_2$.
Figure 12:
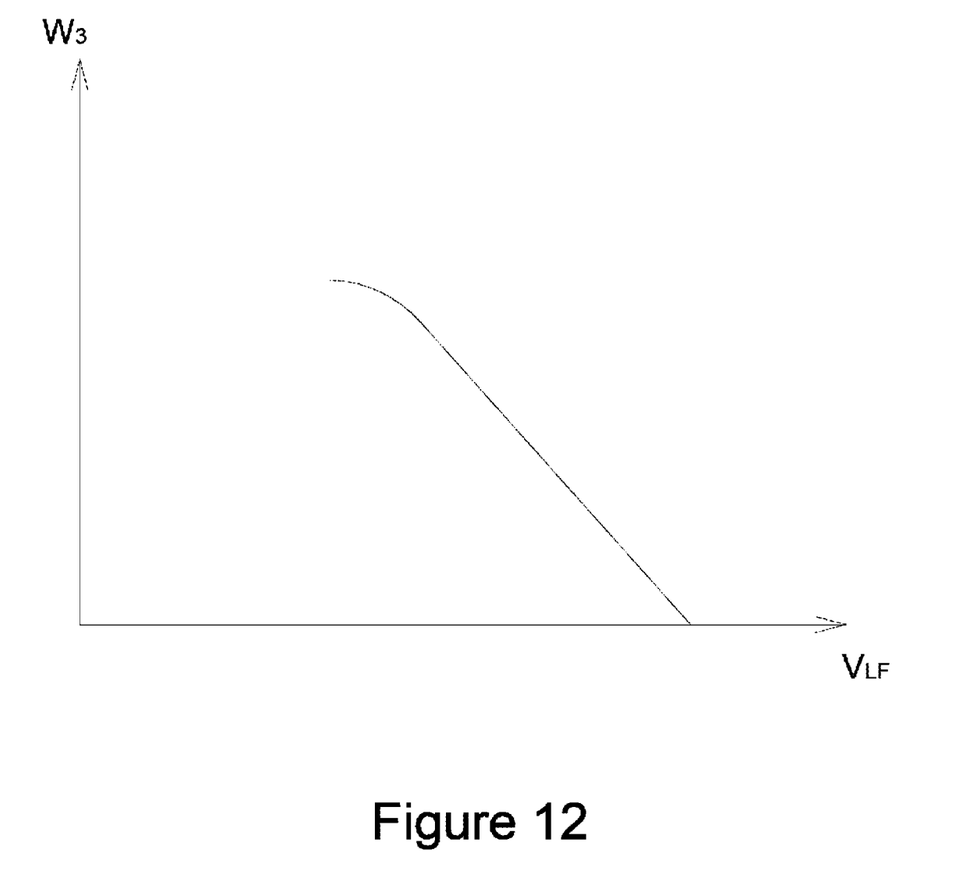
FIG. 12 is a relation curve between a low-frequency (LF) parameter $V_{LF}$ and a parameter $W_3$.

It is appreciated from FIG. 10 to FIG. 12 and the description of determining the weight W that, under situations that other parameters stay unchanged (e.g., the chrominance HF parameter $V_{HF}$ and the chrominance LF parameter $V_{LF}$ stay unchanged), the weight W is positively correlated with the difference (e.g., $|d_1-d_2|$) between the first difference $d_1$ and the second difference $d_2$. Further, a significance of the positive correlation lies in that, when the difference between the first difference $d_1$ and the second difference $d_2$ is large, it means that the initial chrominance values Cb and Cr of the pixel $P_5$ are extremely approximate to the initial chrominance values Cb and Cr of the target pixel (i.e., the pixel $P_1$ or the pixel $P_9$). Therefore, even if the weight W of the initial chrominance values Cb and Cr of the target pixel is large, chrominance distortion of the pixel $P_5$ shall not be resulted. Otherwise, when the difference between the first difference $d_1$ and the difference $d_2$ is small, it means that the initial chrominance values Cb and Cr of the pixel $P_5$ are intermediate values of the initial chrominance values Cb and Cr of the pixel $P_1$ or the pixel $P_9$, i.e., when the initial chrominance values Cb and Cr of the pixel $P_5$ are adjusted according to the initial chrominance values Cb and Cr of the pixel $P_1$ or the pixel $P_9$, a relatively large error is likely to be incurred, such that chrominance distortion of the pixel $P_5$ is created. Therefore, the weight W of the initial chrominance values of the target pixel is designed as being relatively low, i.e., the initial chrominance values Cb and Cr of the pixel $P_5$ are adjusted as least as possible, and the adjusted chrominance values Cb and Cr of the pixel $P_5$ are approximate to its initial chrominance values Cb and Cr.

When the difference between the first difference $d_1$ and the second difference $d_2$ (e.g., $|d_1-d_2|$) stays unchanged, the weight W is approximately negatively correlated with the chrominance HF parameter $V_{HF}$ and the chrominance LF parameter $V_{LF}$, i.e., when chrominance values of the pixels $P_1$ to $P_9$ drastically change (i.e., the chrominance HF parameter $V_{HF}$ is high) or the pixels $P_1$ to $P_9$ exhibit a gradient color (i.e., the chrominance LF parameter $V_{LF}$ is high), the weight W is designed as being relatively low, so as to adjust the chrominance values Cb and Cr of the pixel $P_5$ as least as possible. Therefore, the adjusted chrominance values Cb and Cr of the pixel $P_5$ are approximate to its initial chrominance values Cb and Cr.

It is to be noted that, the diagrams of the weights $W_1$, $W_2$ and $W_3$ in FIG. 10 to FIG. 12 are implemented in this embodiment as an example. In other embodiments of the present disclosure, provided that the weight $W_1$ is approximately positively correlated with the difference between the first difference $d_1$ and the second difference $d_2$, the weight $W_2$ is approximately negatively correlated with the chrominance HF parameter $V_{HF}$, and $W_3$ is approximately negatively correlated with the chrominance LF parameter $V_{LF}$, the weights $W_1$, $W_2$ and $W_3$ may also be calculated by other formulae. In addition, in another embodiment of the present disclosure, the weight W is directly generated according to the first difference $d_1$, the second difference $d_2$, the chrominance HF parameter $V_{HF}$ and the chrominance LF parameter $V_{LF}$ via a calculation formula or a lookup table.

After the chrominance adjusting unit 725 performs image processing similar to that performed on the pixel $P_5$ on each pixel of the image frame data $F_{in}'$, an adjusted image frame data $F_{out}$ is outputted.

In addition, it is to be noted that, the first difference $d_1$, the second difference $d_2$, the chrominance HF parameter $V_{HF}$ and the chrominance LF parameter $V_{LF}$ are simultaneously taken into consideration, and the foregoing weight W is determined according to all of the weights $W_1$, $W_2$ and $W_3$. However, in other embodiments of the present disclosure, only certain parameters from the first difference $d_1$, the second difference $d_2$, the chrominance HF parameter $V_{HF}$ and the chrominance LF parameter $V_{LF}$ is taken into consideration, and the weight W is determined according to one or two of the weights $W_1$, $W_2$ and $W_3$. For example, when only influences brought by the chrominance HF parameter $V_{HF}$ needs to be considered (i.e., the chrominance LF parameter determining unit 724 may be removed, and some functions of the chrominance adjusting unit 725 may be also be removed), the chrominance adjusting unit 725 weighted-averages the initial chrominance values Cb and Cr of the pixel $P_5$ and the initial chrominance values Cb and Cr of the target pixel to obtain two adjusted chrominance values of the pixel $P_5$, and the two adjusted chrominance values are calculated as:

$$Cb_{P5\_adj}=W_2*Cb_{Ptar}+(1-W_2)*Cb_{P5} \quad (12)$$

$$Cr_{P5\_adj}=W_2*Cr_{Ptar}+(1-W_2)*Cr_{P5} \quad (13)$$

In another example, when only influences brought by the chrominance LF parameter $V_{LF}$ needs to be considered (i.e., the chrominance LF parameter determining unit 723 may be removed, and some functions of the chrominance adjusting unit 725 may be also be removed), the chrominance adjusting unit 725 weighted-averages the initial chrominance values Cb and Cr of the pixel $P_5$ and the initial chrominance values Cb and Cr of the target pixel to obtain two adjusted chrominance values of the pixel $P_5$, and the two adjusted chrominance values are calculated as:

$$Cb_{P5\_adj}=W_3*Cb_{Ptar}+(1-W_3)*Cb_{P5} \quad (14)$$

$$Cr_{P5\_adj}=W_3*Cr_{Ptar}+(1-W_3)*Cr_{P5} \quad (15)$$

Other combination approaches (e.g., only the first difference $d_1$ and the second difference $d_2$ are taken into consideration, or the first difference $d_1$, the second difference $d_2$ and the chrominance LF parameter $V_{LF}$ are taken into consideration) are readily apparent to a person having ordinary skills in the art after reading the foregoing description, and details thereof shall not be described for brevity.

In addition, in the embodiment in FIG. 7 and FIG. 8, the chrominance difference calculating unit 721 calculates differences between two initial chrominance values of the pixel $P_5$ and those of the pixel $P_1$ to determine the first difference $d_1$, calculates the differences between the two initial chrominance values of the pixel $P_5$ and those of the pixel $P_9$ to determine the second difference $d_2$, and weighted-averages the two initial chrominance values of the pixel $P_5$ and the two initial chrominance values of the target pixel to obtain two adjusted chrominance values of the pixel $P_5$. However, in another embodiment of the present disclosure, the chrominance difference calculating unit 721 may only calculate a difference between one initial chrominance value (e.g., the initial chrominance value Cb) of the pixel $P_5$ and that of the pixel $P_1$ to determine a first difference $d_1$, and calculate a difference between the initial chrominance value Cb of the pixel $P_5$ and that of the pixel $P_9$ to determine a second difference $d_2$. After that, the target pixel determining unit 722 compares the first difference $d_1$ with the second difference $d_2$ to select either the pixel $P_1$ or the pixel $P_9$ as a target pixel. The chrominance HF parameter determining module 723 determines a chrominance HF parameter $V_{HF}$ of the pixels $P_1$ to $P_9$ for representing a change in initial chrominance values of the pixels $P_1$ to $P_9$ is calculated via Formula (1) or calculated as:

$$V_{HF}=|Cb\_end\_diff-Cb\_sum\_diff| \quad (16)$$

Wherein, Cb_end_diff and Cb_sum_diff are calculated with reference to Formula (2) and Formula (3). In addition, the chrominance LV parameter $V_{LF}$ determines a chrominance LF parameter $V_{LF}$ of the pixels $P_1$ to $P_9$ for presenting a degree of the gradient color of initial chrominance values of the pixels $P_1$ to $P_9$ is calculated via Formula (6) or calculated as:

$$V_{LF}=|1/Cb\_diff| \qquad (17)$$

Wherein, Cb_diff is calculated with reference to Formula (7.1).

The chrominance adjusting unit 725 weighted-averages the initial chrominance value Cb of the pixel $P_5$ and the initial chrominance value Cb of the target pixel to obtain and adjusted chrominance value Cb calculated as:

$$Cb_{P5\_adj}=W*Cb_{Ptar}+(1-W)*Cb_{P5} \qquad (18)$$

Wherein, W is determined according to one or several of the first difference $d_1$, the second difference $d_2$, the chrominance HF parameter $V_{HF}$ and the chrominance LF parameter $V_{LF}$, and details thereof being with reference to the description of Step 808 are readily apparent to a person having ordinary skills in the art after reading the foregoing description, and shall not be described for brevity.

In conclusion, according to an image processing apparatus and an image processing method of the present disclosure, a degree for adjusting image chrominance is determined according to one or several parameters from a difference between a first difference and a second difference, a chrominance HF parameter and a chrominance LF parameter. Accordingly, a problem of image edge blur is effectively solved without incurring image distortion.

While the disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing method, comprising:
receiving image data comprising a first pixel, a second pixel, and a third pixel, all of which being neighboring pixels, the second pixel being between the first pixel and the third pixel;
calculating, based on the Pythagorean theorem, a first difference between two initial chrominance values of the first pixel and two initial chrominance values of the second pixel and a second difference between the two initial chrominance values of the second pixel and two initial chrominance values of the third pixel, wherein the first difference is a coordinate distance in a chrominance domain between the two initial chrominance values of the first pixel and the two initial chrominance values of the second pixel, and the second difference is a coordinate distance in the chrominance domain between the two initial chrominance values of the second pixel and the two chrominance values of the third pixel;
selecting one of the first pixel and the third pixel as a target pixel by comparing the first difference with the second difference, wherein the first pixel is selected as the target pixel when the first difference is smaller than the second difference, and the third pixel is selected as the target pixel when the first difference is larger than the second difference; and
determining two adjusted chrominance values of the second pixel according to initial chrominance values of the target pixel, wherein determining the two adjusted chrominance values of the second pixel comprises:
weighted-averaging the two initial chrominance values of the second pixel and the two initial chrominance values of the target pixel to generate the two adjusted chrominance values of the second pixel;
determining a first weight for the target pixel and a second weight for the second pixel according to a third difference between the first difference and the second difference, the first weight being positively correlated to the third different and the second weight corresponding to the first weight; and
determining a chrominance high-frequency (HF) parameter for a range including pixels on two sides of the second pixel, the chrominance HF parameter representing a chrominance change in the range, and
wherein determining the first weight for the target pixel and the second weight for the second pixel comprises:
determining the first weight for the target pixel and the second weight for the second pixel according to the chrominance HF parameter, the first weight being negatively correlated to the third different and the second weight corresponding to the first weight.

2. The method as recited in claim 1, wherein determining the two adjusted chrominance values of the second pixel comprises:
applying two initial chrominance values of the target pixel as the two adjusted chrominance values of the second pixel.

3. The method as recited in claim 1, wherein:
determining the two adjusted chrominance values of the second pixel further comprises:
determining a chrominance low-frequency (LF) parameter for a range including pixels on two sides of the second pixel, the chrominance LF parameter representing a degree of gradient color of the range; and
determining the first weight for the target pixel and the second weight for the second pixel comprises:
determining the first weight for the target pixel and the second weight for the second pixel according to the chrominance LF parameter, the first weight being negatively correlated to the third different and the second weight corresponding to the first weight.

4. An image processing apparatus that receives image data and generates adjusted image data, the image data at least comprising a plurality of neighboring pixels including a first pixel, a second pixel, and a third pixel, the second pixel being between the first pixel and the third pixel, the image processing apparatus comprising:
a chrominance difference calculating unit that calculates a first difference between two initial chrominance values of the first pixel and two initial chrominance values of the second pixel and a second difference between the two initial chrominance values of the second pixel and two initial chrominance values of the third pixel, wherein the first difference is a coordinate distance in a chrominance domain between the two initial chrominance values of the first pixel and the two initial chrominance values of the second pixel, and the second difference is a coordinate distance in the chrominance domain between the two initial chrominance values of the second pixel and the two chrominance values of the third pixel;
a target pixel determining unit that compares the first difference with the second difference to select one of the first pixel and the third pixel as a target pixel, wherein the first pixel is selected as the target pixel when the first difference is smaller than the second difference, and the third pixel is selected as the target pixel when the first difference is larger than the second difference;

a chrominance adjusting unit that determines two adjusted chrominance values of the second pixel according to initial chrominance values of the target pixel, wherein the chrominance adjusting unit weighted-averages the two initial chrominance values of the second pixel and two initial chrominance values of the target pixel to respectively generate the two adjusted chrominance values of the second pixel; and a chrominance high-frequency (HF) parameter determining unit that determines a chrominance HF parameter for a range including pixels on two sides of the second pixel, the chrominance HF parameter representing a chrominance change in the range, wherein, the chrominance adjusting unit determines the first weight for the target pixel and the second weight for the second pixel according to the chrominance HF parameter, the first weight being negatively correlated to the third different and the second weight corresponding to the first weight.

5. The apparatus as recited in claim 4, wherein the chrominance adjusting unit applies two initial chrominance values of the target pixel as the two adjusted chrominance values of the second pixel.

6. The apparatus as recited in claim 4, wherein the chrominance adjusting unit determines a first weight for the target pixel and a second weight for the second pixel according to a third difference between the first difference and the second difference, the first weight being positively correlated to the third different and the second weight corresponding to the first weight.

7. The apparatus as recited in claim 4, further comprising:

a chrominance low-frequency (LF) parameter determining unit that determines a chrominance LF parameter for a range including pixels on two sides of the second pixel, the chrominance LF parameter representing a degree of gradient color of the range;

wherein, the chrominance adjusting unit determines the first weight for the target pixel and the second weight for the second pixel according to the chrominance LF parameter, the first weight being negatively correlated to the third different and the second weight corresponding to the first weight.

8. An image processing method comprises:

receiving image data comprising a first pixel, a second pixel, and a third pixel, all of which being neighboring pixels, the second pixel being between the first pixel and the third pixel;

calculating a first difference between an initial chrominance value of the first pixel and an initial chrominance value of the second pixel and a second difference between the initial chrominance value of the second pixel and an initial chrominance value of the third pixel, wherein the initial chrominance value is one of Cb value and Cr value of the respective pixel, wherein the first difference is a coordinate distance in a chrominance domain between the initial chrominance value in a Cb axis and a Cr axis of the first pixel and the initial chrominance value of the second pixel in the Cb axis and the Cr axis, and the second difference is a coordinate distance in the chrominance domain between the initial chrominance value of the second pixel in the Cb axis and the Cr axis and the chrominance value of the third pixel in the Cb axis and the Cr axis;

selecting either the first pixel or the third pixel as a target pixel by comparing the first difference with the second difference, wherein the first pixel is selected as the target pixel when the first difference is smaller than the second difference, and the third pixel is selected as the target pixel when the first difference is larger than the second difference; and determining an adjusted chrominance value of the second pixel according to an initial chrominance value of the target pixel and the initial chrominance value of the second pixel, wherein determining the adjusted chrominance value of the second pixel comprises:

weighted-averaging two initial chrominance values of the second pixel and two initial chrominance values of the target pixel to generate two adjusted chrominance values of the second pixel; and determining a first weight for the target pixel and a second weight for the second pixel according to a third difference between the first difference and the second difference, the first weight being positively correlated to the third different and the second weight corresponding to the first weight, wherein determining the adjusted chrominance value of the second pixel further comprises determining a chrominance high-frequency (HF) parameter for a range including pixels on two sides of the second pixel, the chrominance HF parameter representing a chrominance change in the range, and wherein determining the first weight for the target pixel and the second weight for the second pixel comprises determining the first weight for the target pixel and the second weight for the second pixel according to the chrominance HF parameter, the first weight being negatively correlated to the third different and the second weight corresponding to the first weight.

9. The method as recited in claim 8, wherein:

determining the adjusted chrominance value of the second pixel comprises:

determining a chrominance low-frequency (LF) parameter for a range including pixels on two sides of the second pixel, the chrominance LF parameter representing a degree of gradient color of the range; and determining the first weight for the target pixel and the second weight for the second pixel comprises:

determining the first weight for the target pixel and the second weight for the second pixel according to the chrominance LF parameter, the first weight being negatively correlated to the third different and the second weight corresponding to the first weight.

* * * * *